(12) United States Patent
Ji et al.

(10) Patent No.: US 9,072,054 B2
(45) Date of Patent: Jun. 30, 2015

(54) DOWNLINK POWER CONTROL METHOD AND APPARATUS OF OFDM SYSTEM

(71) Applicant: Samsung Electronics Co. Ltd., Suwon-si, Gyeonggi-do (KR)

(72) Inventors: Hyoungju Ji, Seoul (KR); Younsun Kim, Seongnam-si (KR); Joonyoung Cho, Suwon-si (KR); Seunghoon Choi, Suwon-si (KR); Kiil Kim, Yongin-si (KR); Hyojin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 13/721,780

(22) Filed: Dec. 20, 2012

(65) Prior Publication Data

US 2013/0157709 A1    Jun. 20, 2013

(30) Foreign Application Priority Data

Dec. 20, 2011 (KR) .......................... 10-2011-0138121

(51) Int. Cl.
*H04W 52/04* (2009.01)
*H04W 52/38* (2009.01)
*H04W 52/18* (2009.01)
*H04W 52/14* (2009.01)
*H04W 52/24* (2009.01)

(52) U.S. Cl.
CPC ............ *H04W 52/04* (2013.01); *H04W 52/143* (2013.01); *H04W 52/243* (2013.01); *Y02B 60/50* (2013.01); *H04W 52/38* (2013.01)

(58) Field of Classification Search
CPC . H04W 52/143; H04W 52/244; H04W 52/04; H04W 52/243; H04W 52/38; H04L 5/0048
USPC ........................................... 455/522; 370/330
See application file for complete search history.

(56) References Cited

U.S. PATENT DOCUMENTS

2014/0086203 A1* 3/2014 Furuskar et al. .............. 370/330

FOREIGN PATENT DOCUMENTS

WO    WO 2012154094 A1 * 11/2012 ............ H04W 52/34

* cited by examiner

*Primary Examiner* — Wesley Kim
*Assistant Examiner* — Devan Sandiford
(74) *Attorney, Agent, or Firm* — Jefferson IP Law, LLP

(57) ABSTRACT

A downlink power control method and apparatus for improving downlink power efficiency gain in an Orthogonal Frequency Division Multiplexing (OFDM) system is provided. The downlink power control method includes transmitting a downlink data channel at a normal subframe according to first downlink power information for the normal subframe, and transmitting the downlink data channel at an Almost Blank Subframe (ABS) according to second downlink power information for the ABS, wherein the first downlink power information for the normal subframe and the second downlink power information for the ABS differ from each other. The downlink power control method and apparatus is capable of regulating inter-cell interference variation between contiguous symbols at a predetermined level in a subframe at a terminal of a neighbor cell and making it possible to schedule the UE receiving the low power data channel using the power ratio of the feedbacks from the UE.

14 Claims, 15 Drawing Sheets

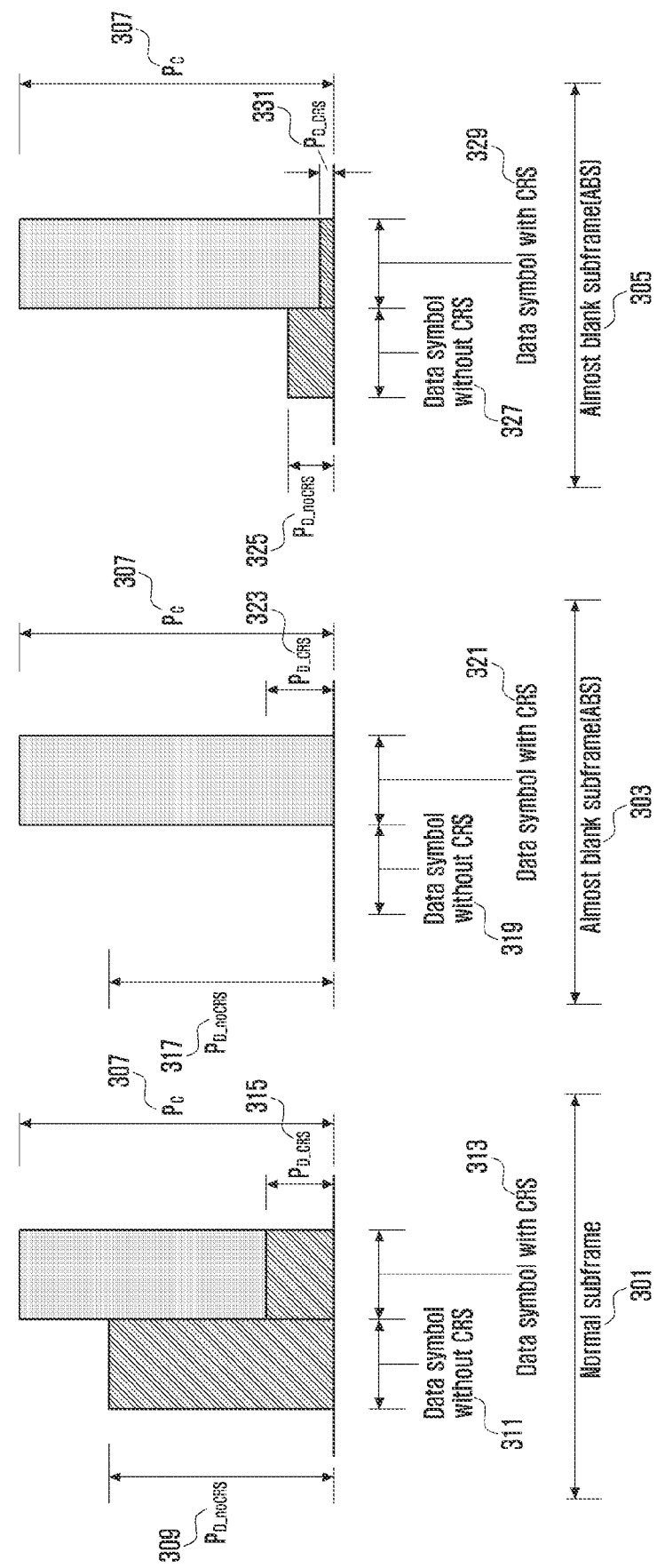

DOWNLINK POWER CONTROL METHOD AND APPARATUS OF OFDM SYSTEM

PRIORITY

This application claims the benefit under 35 U.S.C. §119 (a) of a Korean patent application filed on Dec. 20, 2011 in the Korean Intellectual Property Office and assigned Serial No. 10-2011-0138121, a Korean patent application filed on Dec. 30, 2011 in the Korean Intellectual Property Office and assigned Serial No. 10-2011-0147297, and a Korean patent application filed on Jan. 11, 2012 in the Korean Intellectual Property Office and assigned Serial No. 10-2012-0003573, the entire disclosure of which is hereby incorporated by reference.

BACKGROUND OF THE INVENTION

1. Field of the Invention

The present invention relates to an Orthogonal Frequency Division Multiplexing (OFDM) system. More particularly, the present invention relates to a downlink power control method and apparatus of the OFDM system.

2. Description of the Related Art

Mobile communication systems developed to provide subscribers with voice communication services on the move. With the rapid advance of mobile communication technology, the mobile communication systems have evolved to support high speed data communication services as well as the standard voice communication services. However, the limited resource and user requirements for higher speed services in current mobile communication systems has spurred the evolution to more advanced mobile communication system.

In order to accomplish the goals, various next generation mobile communication technologies are being developed. The 3rd Generation Partnership Project (3GPP) is standardizing Long Term Evolution-Advanced (LTE-A). LTE-A is a technology for realizing high speed packet-based communication at about up to 1 Gbps. In order to achieve this, discussion are being held on several schemes such as network multiplexing for deploying multiple evolved Node Bs (eNBs) overlappingly in a specific area and for increasing a number of frequency bands supported by an eNB. However, such a configuration increases the interference between eNBs and thus recent studies are focused on the inter-cell interference control based on the time and frequency division techniques.

In addition to the frequency division technique adopted by LTE, the LTE-A has adopted the time division technique. The time division technique is a method for preventing the high transmission power of an eNB from interfering the User Equipment (UE) served by a neighbor eNB at a specific subframe. In this case, the downlink power control of the eNB having a high transmit power level influences the system throughput and there is therefore a need of an enhanced downlink power control technique.

Therefore, a need exists for a system and method for scheduling the UEs connected to the eNB having a high transmit power level at low power level that is capable of scheduling the UEs efficiently even when there are significant power differences between subframes.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method for scheduling the UEs connected to the eNB having a high transmit power level at low power level that is capable of scheduling the UEs efficiently even when there are significant power differences between subframes.

In accordance with an aspect of the present invention, a downlink power control method of a base station is provided. The method includes transmitting a downlink data channel at a normal subframe according to first downlink power information for the normal subframe, and transmitting the downlink data channel at an Almost Blank Subframe (ABS) according to second downlink power information for the ABS, wherein the first downlink power information for the normal subframe and the second downlink power information for the ABS differ from each other.

In accordance with another aspect of the present invention, a base station for controlling downlink power is provided. The base station includes a transmitter for transmitting a downlink data channel at a normal subframe according to first downlink power information for the normal subframe and for transmitting the downlink data channel at an ABS according to second downlink power information for the ABS, wherein the first downlink power information for the normal subframe and the second downlink power information for the ABS differ from each other.

In accordance with another aspect of the present invention, a downlink reception method of a terminal is provided. The method includes receiving a downlink data channel at a normal subframe according to first downlink power information for the normal subframe, and receiving the downlink data channel at an ABS according to second downlink power information for the ABS, wherein the first downlink power information for the normal subframe and the second downlink power information for the ABS differ from each other.

In accordance with still another aspect of the present invention, a terminal for receiving downlink data channel is provided. The terminal includes a receiver for receiving a downlink data channel at a normal subframe according first downlink power information for normal subframe and for receiving the downlink data channel at an ABS according to second downlink power information for the ABS, wherein the first downlink power information for the normal subframe and the second downlink power information for the ABS differ from each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a diagram illustrating a configuration of a transmit power of an eNB according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
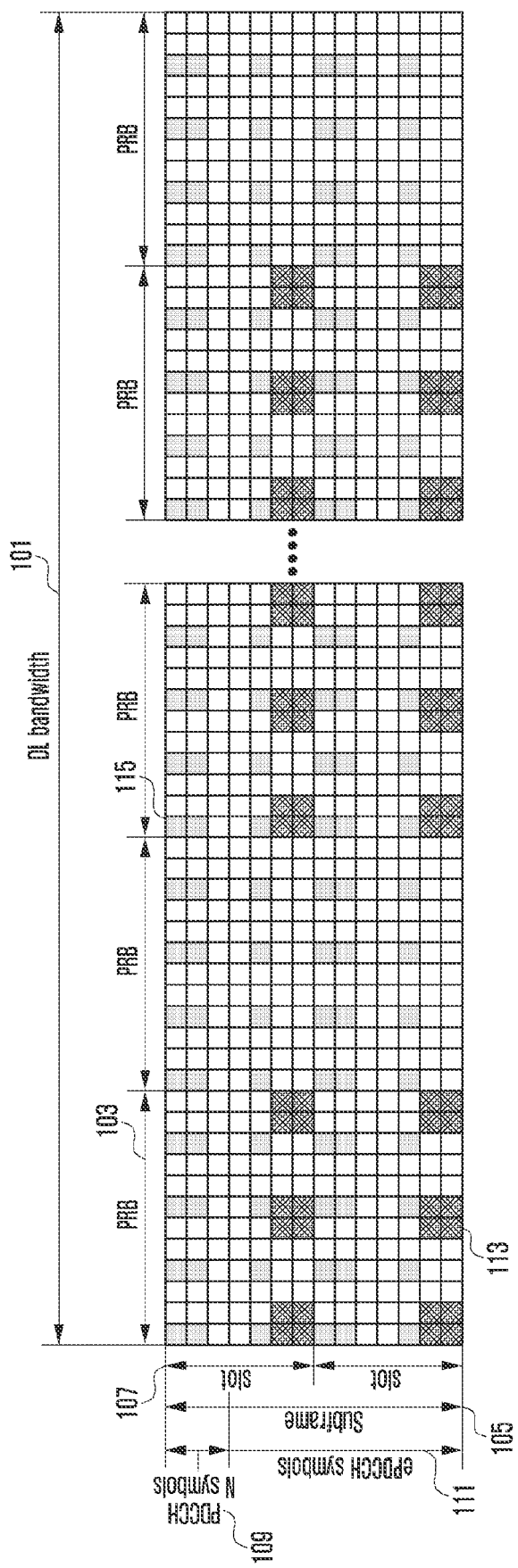
FIG. 1 is a diagram illustrating a downlink subframe and resource structure for use in an Orthogonal Frequency Division (OFDM) system to which exemplary embodiments of the present invention are applied.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms and words used in the specification and claims must be regarded as concepts selected by the inventor as the best method of illustrating the present invention, and must be interpreted as having meanings and concepts adapted to the scope and sprit of the present invention to understand the technology of the present invention.

Although the description is directed to the Long Term Evolution (LTE) and Long Term Evolution-Advanced (LTE-A) Time-Division Duplex (TDD) system, it will be understood by those skilled in the art that the subject matter of the present invention can be applied to other mobile communication systems supporting the base station scheduling with a slight modification, without departing from the spirit and scope of the present invention.

Orthogonal Frequency Division (OFDM) is a transmission technique for transmitting data using multiple carriers (e.g., a multicarrier data transmission technique which parallelizes the serial input stream into parallel data streams and modulates the data streams onto the orthogonal multiple carriers, i.e., sub-carrier channels).

The origins of multicarrier modulation scheme started in the late 1950's with microwave radio for military communication. OFDM using orthogonal overlapping multiple subcarriers was developed in 1970's but its application to the real systems was limited due to the difficulty associated with implementing orthogonal modulations between multiple carriers. With the introduction of the idea of using a Discrete Fourier Transform (DFT) for implementation of the generation and reception of OFDM signals, by Weinstein in 1971, the OFDM technology has developed rapidly. Additionally, the introduction of a guard interval at the start of each symbol and the use of a Cyclic Prefix (CP) overcomes the negative effects caused by multipath signals and delay spread.

Owing to such technical advances, the OFDM technology is applied in various digital communications fields such as Digital Audio Broadcasting (DAB), Digital Video Broadcasting (DVB), Wireless Local Area Network (WLAN), Wireless Asynchronous Transfer Mode (WATM), and the like. For example, the implementation of OFDM may be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but is much more spectrally efficient for achieving high speed data transmission by overlapping multiple subcarriers orthogonally. Due to the spectral efficiency and robustness to the multipath fading, OFDM has been considered a prominent solution for broadband data communication systems.

Other advantages of OFDM are to control the Inter-symbol Interference (ISI) using the guard interval and reduce the complexity of equalizer in view of hardware as well as spectral efficiency and robustness to the frequency selective fading and multipath fading. OFDM is also robust to the impulse noise so as to be employed in various communication systems.

In wireless communications, high-speed, high-quality data services are generally hindered by the channel environments. In wireless communications, the channel environments suffer from frequent changes not only due to Additive White Gaussian Noise (AWGN) but also power variation of received signals caused by a fading phenomenon, shadowing, a Doppler effect brought by movement of a UE and a frequent change in a velocity of the UE, interference by other users or multipath signals, and the like. Therefore, in order to support high-speed, high-quality data services in wireless communication, there is a need to efficiently overcome the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. For example, the OFDM scheme defines one minimum unit resource by designating a particular OFDM symbol on the time domain and a particular tone on the frequency domain, and the unit resource is called a Resource Element (RE). Because different REs are orthogonal with each other, signals transmitted on different REs can be received without causing interference to each other.

Physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver determine REs on which a physical channel is transmitted, and this process is called mapping.

Exemplary embodiments of the present invention are applicable to both the LTE and LTE-A systems, and the term "LTE" is used so as to include both LTE and LTE-A in the following description. In the following description, the system of LTE release 11 or later is referred to as Rel 11 LTE system.

FIG. 1 is a diagram illustrating a downlink subframe and resource structure for use in the OFDM system to which exemplary embodiments of the present invention are applied.

Referring to FIG. 1, the downlink bandwidth 101 of the OFDM system is typically divided into Resource Blocks (RBs) 103. Each Physical Resource Block (PRB) 103 comprises 12 tones (or subcarriers) in the frequency domain and 14 or 12 OFDM symbols in the time domain. The PRB is a basic unit for resource allocation. The Reference Signal (RS) 115 is transmitted by the eNB for channel estimation of the UE. The eNB and the UE share the RS transmission pattern. In the LTE system, the RS is classified into one of a Common Reference Signal (CRS) and a Dedicated Reference Signal (DRS) 113. A subframe 105 comprises two 0.5 ms slots 107 in the time domain. The subframe 105 may include Physical Downlink Control Channel (PDCCH) symbols 109. The subframe 105 may also include enhanced Physical Downlink Control Channel (ePDCCH) symbols 111.

Figure 2A:
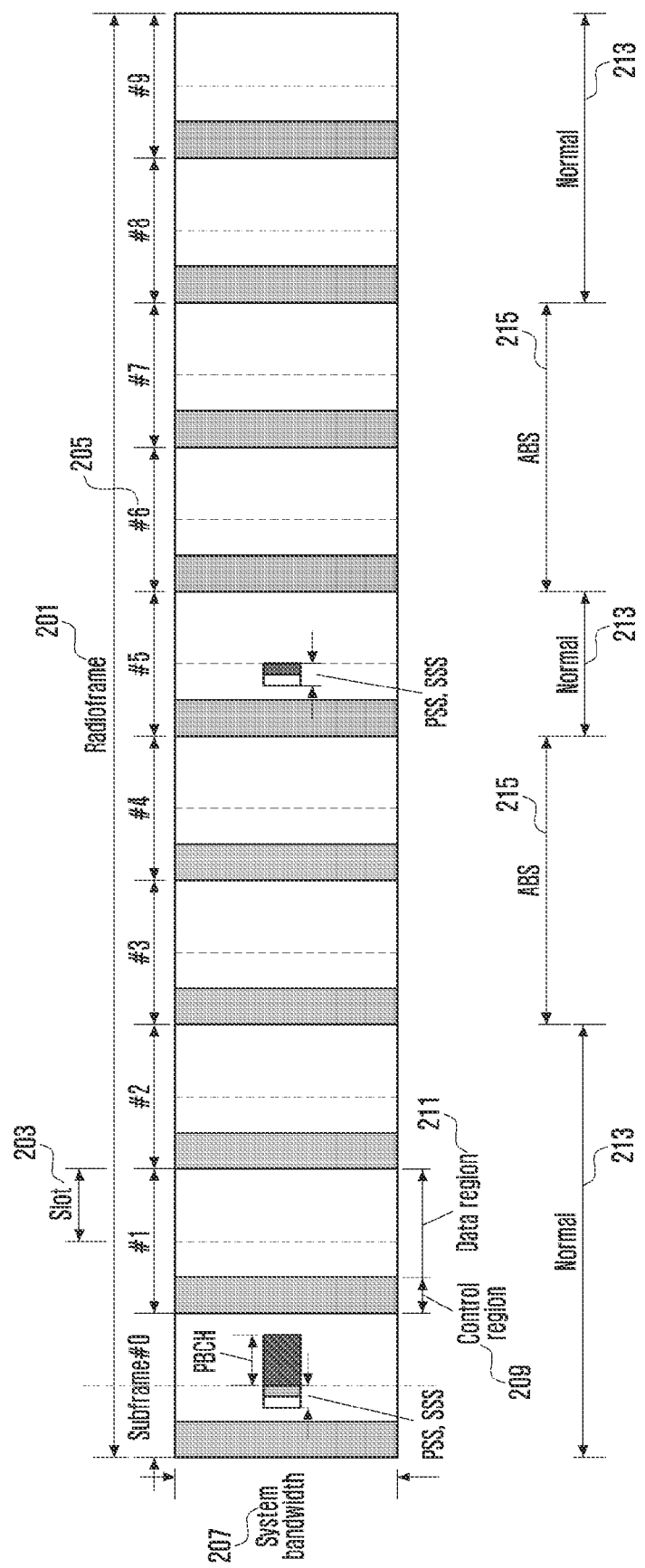
FIG. 2A is a diagram illustrating a structure of a radio frame of a Long Term Evolution (LTE) system according to an exemplary embodiment of the present invention.

FIG. 2A is a diagram illustrating a structure of a radio frame of an LTE system according to an exemplary embodiment of the present invention.

Referring to FIG. 2A, a radio frame 201 may be transmitted over a system bandwidth 207. The radio frame 201 comprises 10 subframes 205. As aforementioned, each subframe 205 comprises two slots 203. The subframe 205 includes a control channel region and a data channel region. From the time domain view point, the control channel region 209 is transmitted first and then the data channel region 211 follows. At every subframe 205, the control channel region 209 and the data channel region 211 appear. In the LTE system, each channel is configured in consideration of the inter-cell distance and interference and designed to guarantee an appropriate reception performance.

The LTE-A system is the overlay system in which the eNBs having low transmit power are deployed in the cell area of the LTE system maintaining the legacy inter-cell distance. Accordingly, in the case in which all eNBs operate on the same frequency band, the interference amount within the cell area increases relative to the LTE system. The intra-cell interference control technique is introduced in order to suppress the interference within a cell area in such a way that an eNB with high transmit power level transmits almost no signal while an eNB with low transmit power level schedules the cell-edge UE, at a certain subframe in the time domain. Such a subframe is referred to as Almost Blank Subframe (ABS).

The eNB with a high transmit power level allocates no power for all REs but the ones to which CRS is mapped in the ABS, thereby reducing the interference to the neighbor eNB in the ABS. However, the power of the CRS has to be kept equally as in the normal subframe. This is because the legacy LTE UE cannot understand ABS but has to acquire the channel estimation information from the CRS at all subframes. If the transmit power of CRS varies at every subframe, the reliability of the UE feedback is degraded, resulting in UE's scheduling failure. Accordingly, the information on which subframe is ABS in the radio frame is not provided to the UE but used for information exchange among the eNBs. According to an exemplary embodiment of the present invention, the radioframe 201 may be divided into normal subframe durations 213 and ABS durations 215.

Figure 2B:
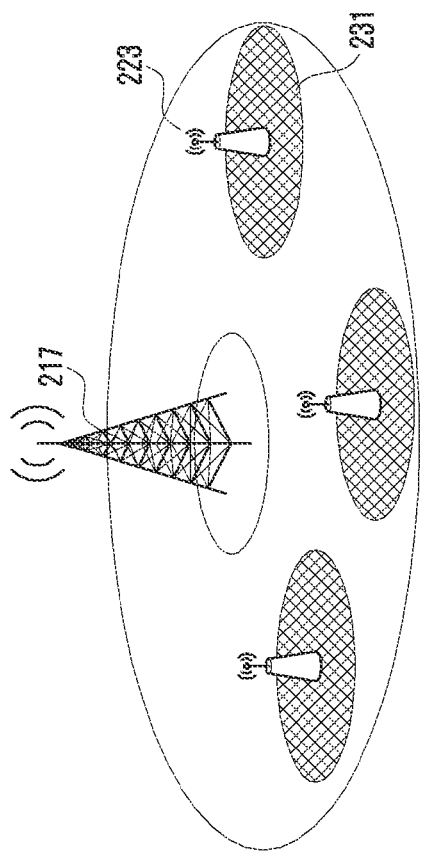
FIG. 2B is a diagram illustrating a coverage relationship among evolved Node Bs (eNBs) at a normal subframe in a system according to an exemplary embodiment of the present invention.
Figure 2C:
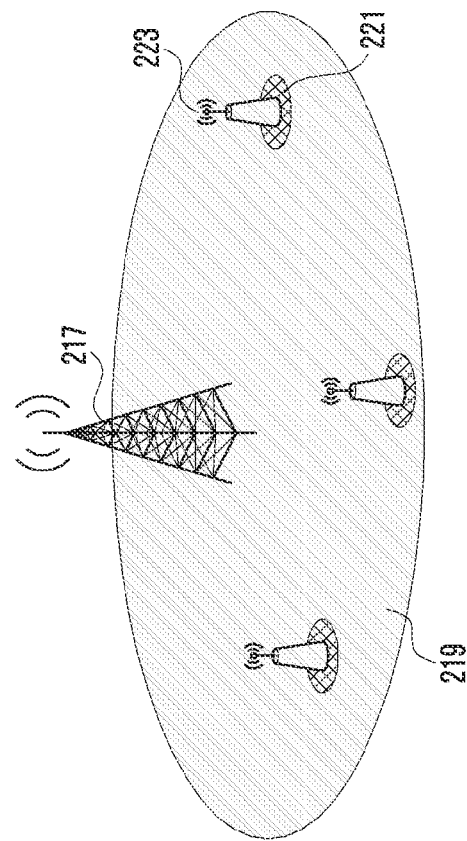
FIG. 2C is a diagram illustrating a coverage relationship among eNBs at an Almost Blank Subframe (ABS) in a system according to an exemplary embodiment of the present invention.

FIG. 2B is a diagram illustrating a coverage relationship among eNBs at a normal subframe in a system according to an exemplary embodiment of the present invention. FIG. 2C is a diagram illustrating a coverage relationship among the eNBs at an ABS in a system according to an exemplary embodiment of the present invention.

Referring to FIGS. 2B and 2C, if the 3rd, 4th, 6th, and 7th subframes of a radio frame 201 are configured as ABS duration 215, the ABS configuration information is sent to the neighbor eNBs. The eNB 217 with a high transmit power level and the eNBs 223 with a low transmit power perform scheduling based on the ABS configuration information. In the normal subframe duration 213, the eNB 217 with the high transmit power level schedules the UEs within the cell region 219. In the normal subframe duration 213, the eNB 223 with the low transmit power level schedules the UE 221 close to the eNB 223 in consideration to the interference from the eNB 217 with the high transmit power level. In the ABS duration 215, the eNB 217 with the high transmit power level uses almost no transmit power, it is difficult to serve the UE. Instead, the eNB 223 with the low transmit power level is capable of scheduling the UEs 231 within the relatively large area.

If the eNB with the high transmit power level does not schedule UEs in the ABS duration 215, the allocated frequency is not used. This results in the reduction of the system throughput. In order to overcome this problem, the ABS is applied along with Cell Range Expansion (CRE). CRE is the technique in which the system controls such that the UEs which are not interfered by the eNB 217 within the cell and are attachable to the eNB 223 with the low transmit power level to be scheduled by the eNB 223. According to CRE, such UEs are scheduled only in the ABS duration 215 with the expansion of the service area of the eNB 223 with the low transmit power level so as to increase the capacity per power input, resulting in increase of network throughput. For example, the eNBs 223 with low transmit power level schedule the UEs in the period when the eNB 217 with high transmit power level cannot perform scheduling, resulting in increase of entire system throughput.

Because ABS and CRE are techniques working based on the cooperation among the cells of the network, the UE is not aware of the application of such techniques but is scheduled by the eNB 223 with the low transmit power level instead of the eNB 217 with the high transmit power level according to the command from the eNB. The eNB does not notify even the LTE-A UE capable of ABS and CRE of the existence of ABS. However, the eNB notifies the LTE-A UE of two types of resource for channel measurement feedback and configures the ABS duration 215 for a certain measurement resource. The eNB performs scheduling separately based on the two separate feedbacks of the UE. Because the signals experience different interferences on the channels of the two channel measurement resource, the eNB is capable of scheduling based on the two different pieces of channel measurement information.

FIG. 3 is a diagram illustrating a configuration of a transmit power of an eNB according to an exemplary embodiment of the present invention.

Referring to FIG. 3, the eNB provides a UE with three pieces of transmit power information for downlink transmission. The three pieces of information are represented by PC, PA, and PB that are defined by equations (1), (2), and (3).

$$PC = \text{CRS power (cell specific), (value range: -60 dBm to 50 dBm)} \quad (1)$$

$$PA = \rho A - \delta \text{offset}(\rho A \text{ Value}: -6 \text{ dB}, -4.77 \text{ dB}, -3 \text{ dB}, -1.77 \text{ dB}, 0 \text{ dB}, 1 \text{ dB}, 2 \text{ dB}, 3 \text{ dB}) \quad (2)$$

$$PB = \rho B / \rho A \quad (3)$$

$P_C$ denotes the CRS transmission power per RE and is identical for all UEs within the cell. $P_A$ denotes a value equal to $\tilde{n}_A$ without consideration of $\ddot{a}_{offset}$. $\tilde{n}_A$ denotes the ratio of the data RE transmit power 309 to the CRS RE transmit power 307 in the data symbol 311 as shown in equation (4) and is a UE-specific value.

$$\tilde{n}_A = P_{D\_noCRS}/PC \quad (4)$$

$\rho B$ denotes the ratio of the data RE transmit power 315 to the CRS transmit power 307 in the data symbol 313 with CRS as shown in equation (5).

$$\tilde{n}_B = P_{D\_CRS}/PC \quad (5)$$

PB denotes the radio of $\rho A$ to $\rho B$ as shown in equation (3) and means the power ration of data RE with CRS to the data RE without CRS. PB is 2-bit information through higher layer signaling and defined as shown in Table 1 according to the number of CRS ports currently used by the eNB.

TABLE 1

| | $\tilde{n}_B/\tilde{n}_A$ | |
|---|---|---|
| $P_B$ | 1 Antenna port | 2 or 4 Antenna ports |
| 0 | 1 | 5/4 |
| 1 | 4/5 | 1 |
| 2 | 3/5 | 3/4 |
| 3 | 2/5 | 1/2 |

The UE uses the three pieces of information for two purposes.

First, the UE uses the three pieces of information for compensating for the power offset of the receiver which is caused by the power difference between the symbol carrying CRS and the symbol carrying no CRS at the demodulation stage. Such information is very important in the case in which the reception power gives significant influence to the modulation such as 16 Quadrature Amplitude Modulation (QAM) or 64 QAM.

Second, the UE uses the three pieces of information for predicting the performance offset caused by the power difference between the CRS symbol and data symbol. The channel estimation and feedback is performed based on the CRS transmitted by the eNB. However, because there is a power difference between the CRS symbol and data symbol, the eNB selects the modulation and coding scheme for the UE in consideration of the difference between the power indicated in the channel information reported by the UE and the actual data symbol transmission power. Accordingly, without the above-described three pieces of information, the eNB cannot select the modulation and coding scheme appropriate for the channel such that the UE fails applying the modulation scheme with optimized coding rate.

In the normal subframe duration 301, the UE receives signals and estimates channel based on the information transmitted by the eNB. In the ABS duration 303 and 305, the eNB is capable of performing two types of transmission. In the case in which no data is transmitted with the exception of CRS, all data REs excluding the REs for CRS are allocated 0 power as denoted by reference number (see 317 and 323) during the data symbol 319 and the data symbol 321 with CRS. In this case, the UE attempts receiving control channel first as in the normal subframe duration 301 but terminates attempting signal reception without reception of data channel because there is no channel transmitted in the ABS duration.

In the case in which the eNB transmits data at very low power level in the ABS duration as denoted by reference number 305, the UE receives the data using the $P_C$, $P_A$, and $P_B$ information. The actual transmit power level in the data symbol 327 is very low as denoted by reference number 325 and thus the value differs from $P_A$. Because the actual transmit power $P_{D\_noCRS}$ 325 in the data symbol 329 with CRS has an offset, the $P_{D\_CRS}$ 331 calculated based on the $P_B$ is also unreliable. Accordingly, in the case in which the eNB uses QAM, the UE is likely to encounter the signal reception error. Also, in the case in which the data is transmitted at a low power level in the ABS duration 305, the eNB performs transmission at very low coding rate because the eNB does not know the appropriate coding rate for the UE. As aforementioned, the eNB cannot use the modulation scheme such as QAM in which power reception ratio is very important but the Quadrature Phase Shift Keying (QPSK), the eNB fails to performing transmission at preferred coding rate. Accordingly, it is very difficult to transmit data channel to the UE in the ABS duration.

In a real system environment, it is not always the case that there is no need for scheduling all UEs in the ABS duration. Although several UEs are located at the same position in the cell, some may be close to an eNB with low transmit power while other may not. Accordingly, in order to maximize the system throughput, it is necessary to allocate the best modulation and coding scheme to the individual UEs as far as not causing interference to the neighbor cells. For this purpose, the eNB has to provide the UE with the power control information such that, although the data channel is transmitted at a low transmit power in the ABS duration, the UE is capable of receiving data channel reliably as in the normal subframe duration.

Figure 4:
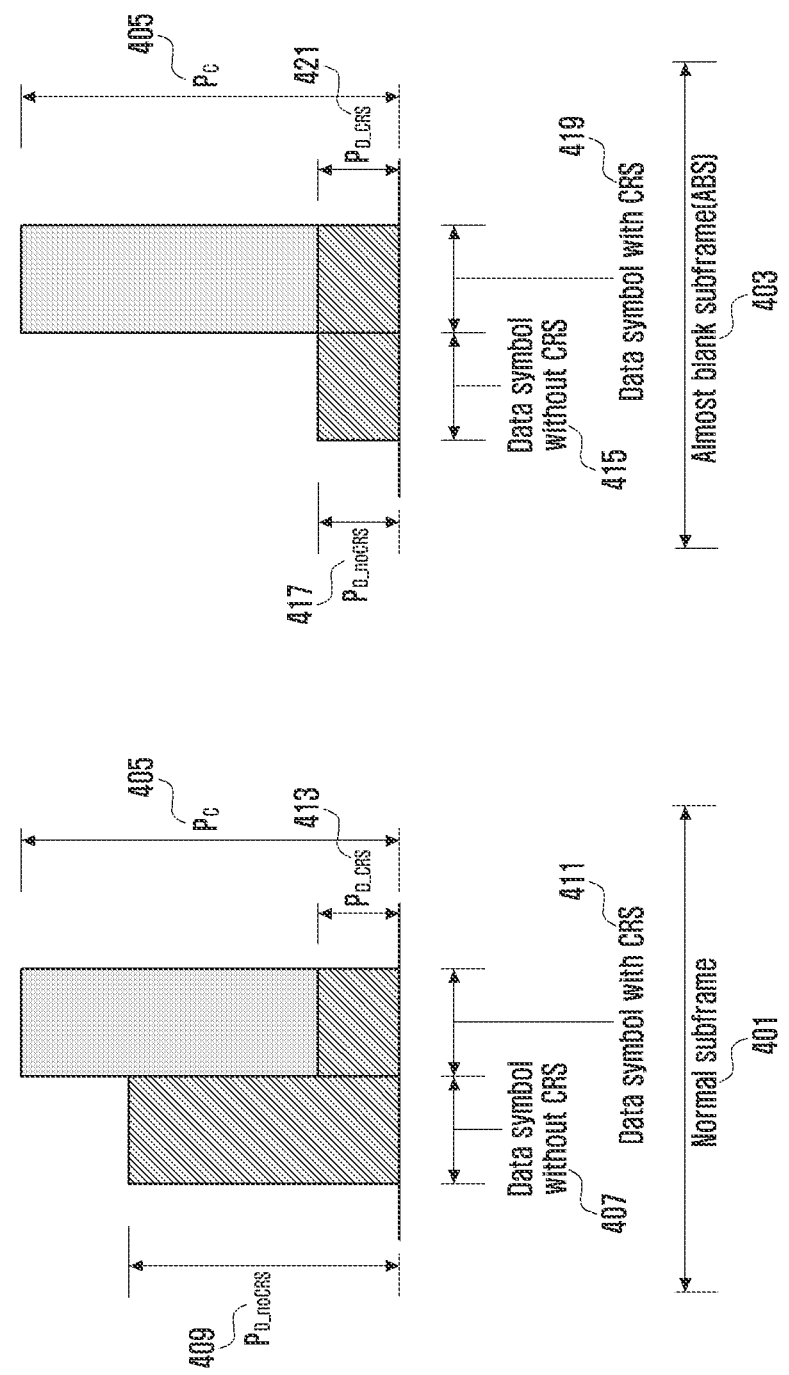
FIG. 4 is a diagram illustrating a configuration of a transmit power of an eNB for a normal subframe and ABS according to an exemplary embodiment of the present invention.

FIG. 4 is a diagram illustrating the configuration of a transmit power of an eNB for a normal subframe and ABS according to an exemplary embodiment of the present invention.

Referring to FIG. 4, according to the first exemplary embodiment of the present invention, the eNB informs the UE of the ABS configuration. The eNB sends the $P_C$, $P_A$, and $P_B$ at the normal subframe 401 for backward compatibility with the legacy system.

The UE receives data channel 407 and 411 and performs channel estimation based on the information. For the data channel power control in the ABS duration 403, the eNB transmits $P_{A\_R11}$. $P_{A\_R11}$ denotes the transmit power of data channel in the ABS duration. The $P_{A\_R11}$ can be transmitted in the form of a function of the relative value to the $P_A$ transmitted in the normal subframe, transmit power absolute value of $PA_{\_R11}$, or offset value for CRE. The UE receives the data channel 415 and 419 using the PA_R11 in the ABS duration 403 under the assumption that $P_B$ is always set to 1. For example, it is assumed that the $P_{D\_noCRS}$ 417 and $P_{D\_CRS}$ 421 are constant in the ABS duration 403.

In the normal subframe 401, because the data symbol 411 with CRS and the data symbol 407 without CRS are discriminated from each other, the information about PB is required. Typically, the transmit power for the symbol carrying is higher as denoted by reference number 405. Unlike the case of the symbol 411 carrying CRS in which the power remained after being allocated for CRS is used for data REs, the entire transmit power 409 of the eNB is allocated for data REs in the symbol 407 carrying no CRS. Accordingly, the transmit power at the data RE in the symbol 407 without CRS is shown greater.

Because the data transmit power is set to very low value in the ABS duration 403, the problem of transmit power drop in the data symbol 419 with CRS due to the CRS transmit power as compared to the data symbol 415 without CRS does not occur as illustrated by $P_{D\_noCRS}$ 417 and $P_{D\_CRS}$ 421. The data symbol in the ABS duration acts as interference to the neighbor eNB with a low transmit power level; however, if the different transmit powers such as $P_{D\_noCRS}$ 409 and $_{PD\_CRS}$ 413 are applied to the respective symbols, the interference of the respective symbols to the neighbor cell is changed.

In the case of adopting CRE, even the tiny transmit power of the eNB may cause large interference. However, if the transmit power is maintained constantly in both the symbol 417 without CRS and the symbol 419 with CRS, the UE located in the neighbor cell does not experience variation in interference, resulting in enhancement of demodulation reliability and UE throughput. Accordingly, there is a need for performing transmission without transmit power shortage and transmit power deference between symbols in the ABS duration 403 with low transmit power.

Table 2 shows a format of higher layer signaling for transmitting the PA_R11 in the form of a relative value of PA. The signaling format can be configured differently depending on the transmission scheme.

TABLE 2

```
-- ASN1START
PDSCH-ConfigCommon ::= SEQUENCE {
    referenceSignalPower    INTEGER (-60 ... 50),
    p-b         INTEGER (0 ... 3)
}
PDSCH-ConfigDedicated::= SEQUENCE {
    p-a         ENUMERATED {
        dB-6, dB-4dot77, dB-3, dB-1dot77,
        dB0, dB1, dB2, dB3}
}
```

TABLE 2-continued

```
PDSCH-ConfigDedicated-r11::= SEQUENCE {
    p-a-r11       ENUMERATED {
        dB-INF, dB-12, dB-11, dB-10, dB-9, dB-7.23,
        dB-6, dB-4.23, dB-3, FFS}
}
-- ASN1STOP
```

Figure 5:
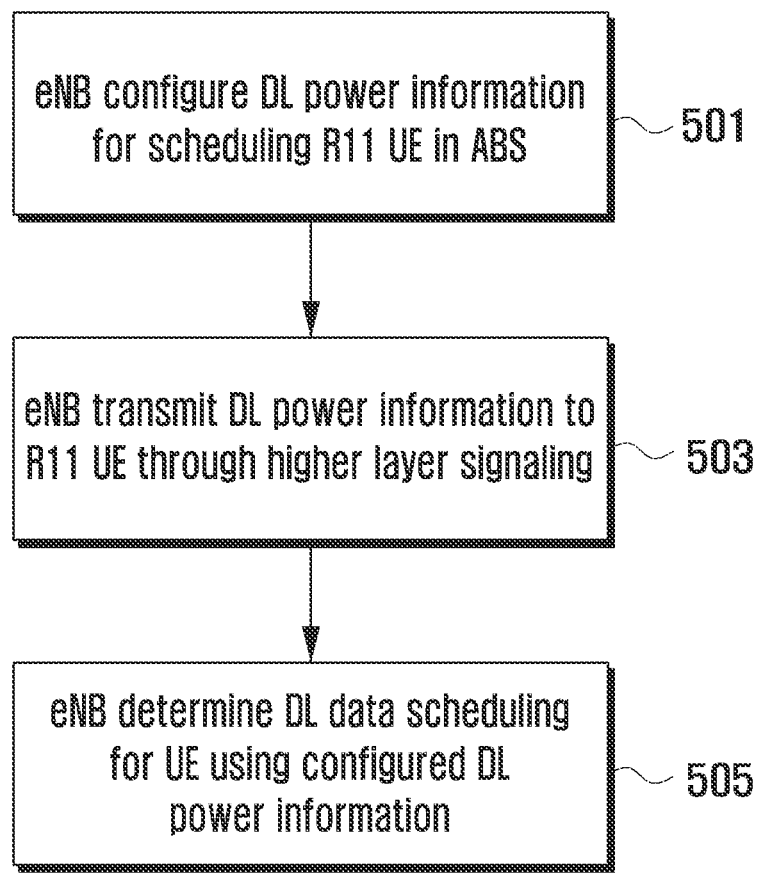
FIG. 5 is a flowchart illustrating an operating procedure of an eNB according to an exemplary embodiment of the present invention.

FIG. 5 is a flowchart illustrating an operating procedure of an eNB according to an exemplary embodiment of the present invention. FIG. 5 illustrates the operations of the eNB that are applicable to all exemplary embodiments of the present invention.

Referring to FIG. 5, the eNB configures the downlink power control information for scheduling the R11 UE in ABS at step 501. The downlink power control information may include the power control information as described with reference to FIGS. 3 and 4. Next, the eNB transmits the downlink power control information configured for R11 UE through higher layer signaling at step 503. Finally, the eNB performs downlink data channel scheduling for the UE based on the configured power control information at step 505.

Figure 6:
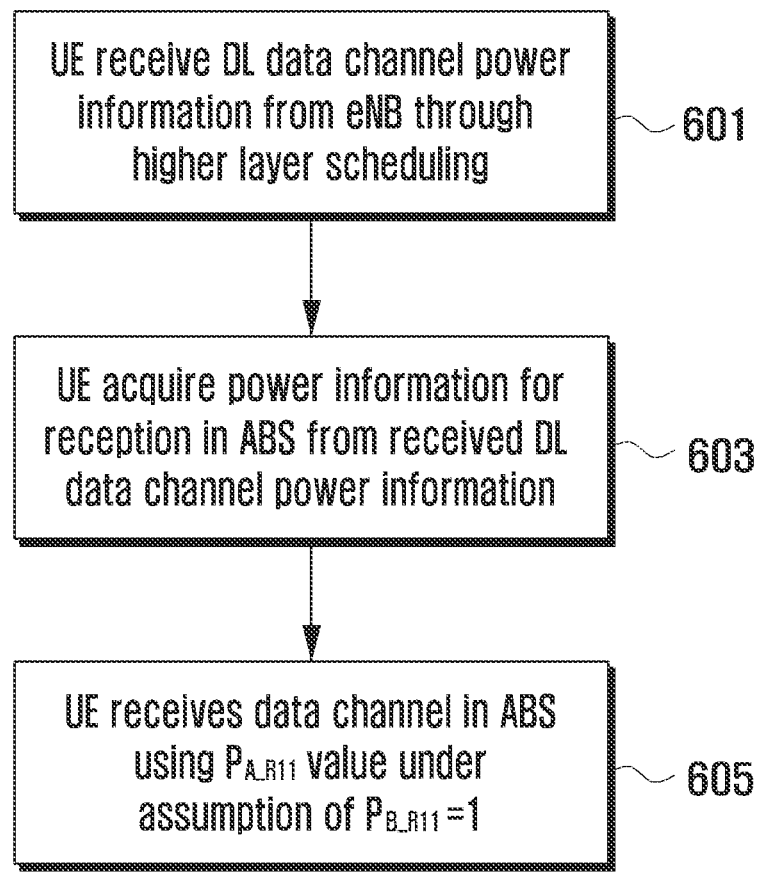
FIG. 6 is a flowchart illustrating an operating procedure of a User Equipment (UE) according to an exemplary embodiment of the present invention.

FIG. 6 is a flowchart illustrating an operating procedure of a UE according to an exemplary embodiment of the present invention.

Referring to FIG. 6, the UE receives the downlink power control information transmitted by the eNB through higher layer signaling at step 601. The downlink power control information may include the above-described $P_{A\_R11}$. The UE extracts the normal subframe power control information and the ABS power control information from the received power control information at step 603. The UE performs demodulation for receiving data channel in the ABS using $P_{A\_R11}$ under the assumption that $P_B$ is 1 in ABS at step 605.

Figure 7:
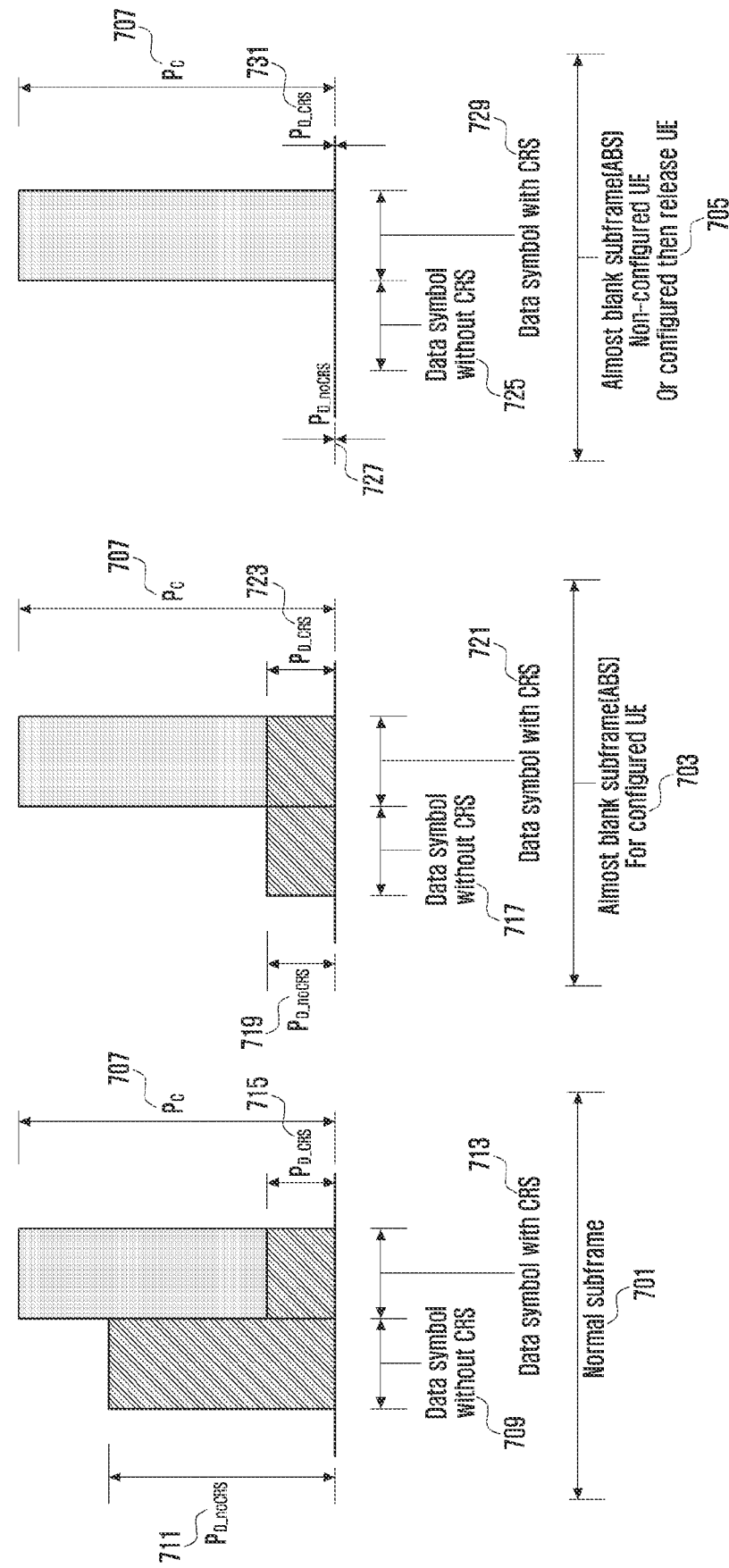
FIG. 7 is a diagram illustrating a configuration of downlink transmit power of an eNB according to a second exemplary embodiment of the present invention.

FIG. 7 is a diagram illustrating a configuration of downlink transmit power of an eNB according to a second exemplary embodiment of the present invention. FIG. 7 shows additional operations in the case that the downlink control information for ABS that is described in the first exemplary embodiment is not configured.

Referring to FIG. 7, according to the second exemplary embodiment of the present invention, the eNB transmits the ABS configuration information to the UE and the ABS power control information per UE. If the ABS power control information is configured for the UE, the $P_C$ 707, $P_A$, and $P_B$ according to the related art are transmitted in the normal subframe 701 for backward compatibility with the legacy system. The transmit power of the eNB illustrated by $P_{D\_noCRS}$ 711 is allocated data REs in the data symbol 709. In the data symbol with CRS 713 the transmit power level is illustrated by $P_{D\_CRS}$ 715. The UE receives data channel 709 and 713 and performs channel estimation using these parameters. In the ABS 703, the eNB further transmit $P_{A\_R11}$ for data channel power control. $P_{A\_R11}$ denotes the power of the data channel in the ABS. $P_{A\_R11}$ can be transmitted in the form of a relative value of $P_A$ transmitted in the normal subframe, a transmit power absolute value of $P_{A\_R11}$, or a function of the offset value for CRE. The UE receives the data channel 717 and 721 using $P_{A\_R11}$ in the ABS duration 703 under the assumption that $P_B$ is always 1 in ABS. In the ABS 703, the transmit power is illustrated by $P_{D\_noCRS}$ 719 in the data symbol 717, and the transmit power is illustrated by $P_{D\_CRS}$ 723 in the data symbol with CRS 721.

Otherwise, if no ABS power control information is configured for the UE as denoted by reference number 705, the $P_C$ 707, $P_A$, and $P_B$ according to the related art are transmitted in the normal subframe for backward compatibility with the legacy system, and the receives data channel 709 and 713 and performs channel estimation using these parameters. It is determined that $P_A$ is a negative infinite value and $P_B$ is always 1. In the ABS that is not configured with power control information for the UE 705, the transmit power is illustrated by $P_{D\_noCRS}$ 727 in the data symbol 725, and the transmit power is illustrated by $P_{D\_CRS}$ 731 in the data symbol with CRS 729.

With this configuration, the R11 UE is capable of performing signal reception or not according to whether the ABS power control information is configured. In the case in which a specific UE at a certain location influence the signal transmission of a neighbor UE, the specific UE is capable of suppressing the interference by skipping configuration of the ABS power control information for the specific UE. The UE is capable of preventing the modulation operation from being performed unnecessarily even though there is no real transmission in the ABS, resulting in avoidance of unnecessary power consumption.

Table 3 shows an exemplary format of higher layer signaling according to whether ABS power control information is configured. The signaling format can be configured differently depending on the information transfer method.

TABLE 3

```
-- ASN1START
PDSCH-ConfigCommon ::= SEQUENCE {
    referenceSignalPower    INTEGER (-60 ... 50),
    p-b        INTEGER (0 ... 3)
}
PDSCH-ConfigDedicated::= SEQUENCE {
    p-a        ENUMERATED }
        dB-6, dB-4dot77, dB-3, dB-1dot77,
        dB0, dB1, dB2, dB3}
}
PDSCH-ConfigDedicated-r11::= CHOICE {
    Release    NULL,
    Setup      SEQUENCE{
        p-a-r11    ENUMERATED {
        dB-INF, dB-12, dB-11, dB-10, dB-9, dB-7.23,
        dB-6, dB-4.23, dB-3, FFS}
    }
}
-- ASN1STOP
```

In the case in which the UE has no ABS power control information configuration, one of the following four UE operations is possible. First, the UE is capable of attempting data channel reception with the power control information received in the normal subframe for the ABS duration in the same manner as the legacy system. Second, the UE is capable of attempting channel reception only for the control channel for uplink and downlink ACK channel. This is because the eNB is capable of scheduling continuously when there is no ABS. Third, the UE is capable of attempting receipt of downlink ACK channel. This is the case in which the uplink transmission may occur even when the ABS is configured and, in this case, it is necessary to receive the ACK channel although there is no control channel transmission. Fourth, the UE may not perform any operation in the ABS no in which ABS power control information is configured. In this case, the UE is capable of reducing unnecessary power consumption by performing no unnecessary operation.

In the case in which the eNB is scheduling the UE in the ABS based on the transmitted information, it is required to avoid interference to the UEs in the neighbor cell as well as transmit the power information to the corresponding UE. As proposed in exemplary embodiments of the present invention, the eNB has to adjust the interference amount to the neighbor cell in the ABS while improving the modulation performance of the UE by configuring the same power in the individual symbols. The interference amount adjustment can be performed based on the power control information transmitted from the eNB to the UE. The interference amount information has to be transferred to the neighbor cells along with Relative Narrow TX Power (RNTP) restriction indicating the extent of interference occurring on each frequency in the normal subframe. Accordingly, the eNB has to notify of the interference amount occurring in the ABS based on the aps power control information along with the RNTP notified per PRB. This procedure can be performed in such a way of transmitting a new RNTP to be applied for the ABS as in the method according to the related art or transmitting a representative value to be applied for ABS along with the RNTP according to the related art.

Figure 8:
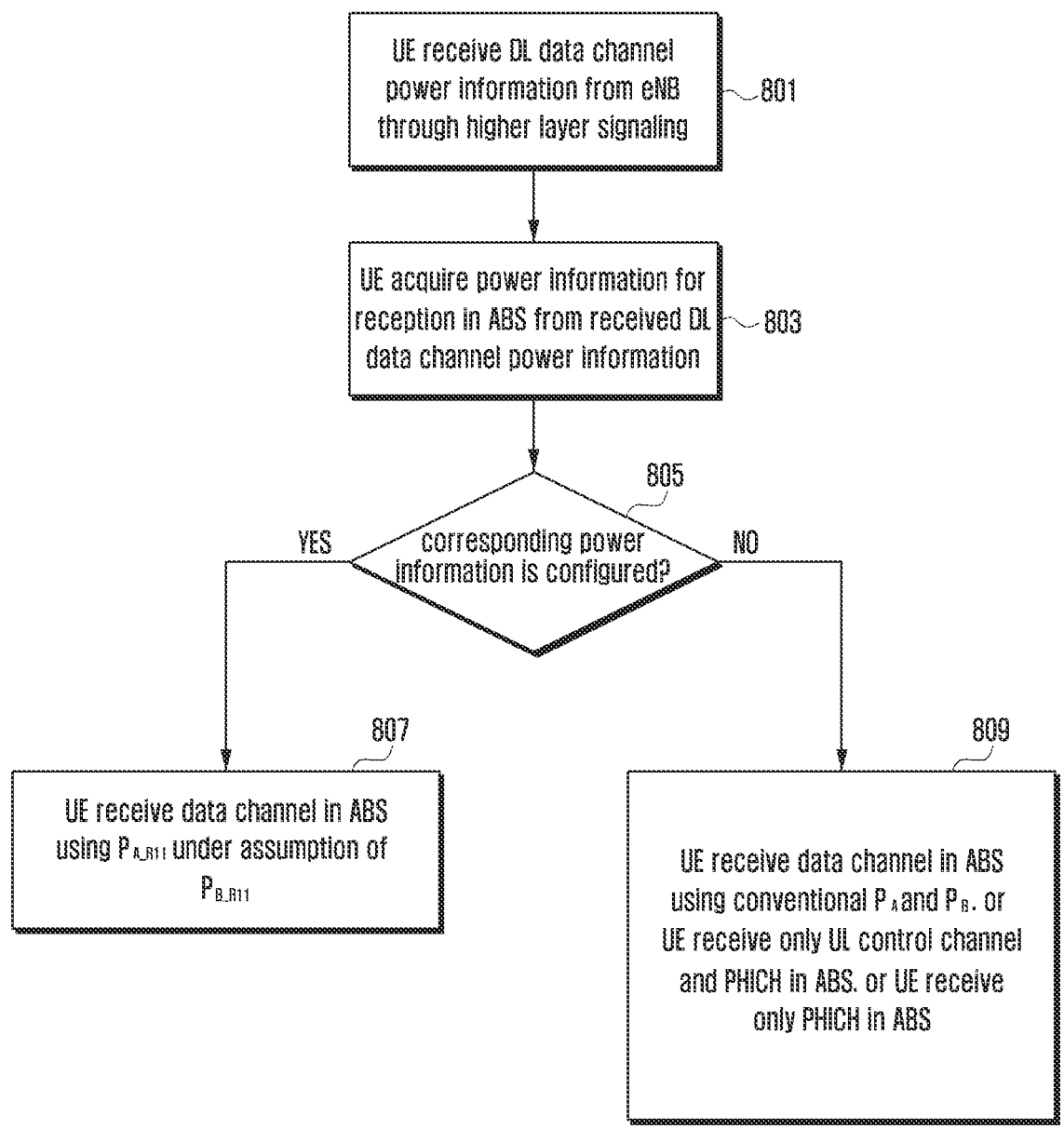
FIG. 8 is a flowchart illustrating an operating procedure of an UE according to the second exemplary embodiment of the present invention.

FIG. 8 is a flowchart illustrating an operating procedure of a UE according to the second exemplary embodiment of the present invention.

Referring to FIG. 8, the UE receives the power control information for the downlink data channel from the eNB through higher layer signaling at step 801. Next, the UE extracts the power information for receiving signal in ABS from the received power information at step 803.

The UE determines whether the ABS power information is configured (e.g., the ABS power information is received successfully) at step 805. If the ABS power information is configured, the procedure proceeds to step 807. At step 807, the UE receives the data channel in the ABS using $P_{A\_R11}$ value received for data channel reception in ABS under the assumption that $P_B$ is 1. If it is determined at step 805 that the ABS power information is not configured, the procedure proceeds to step 809. At step 809, the UE is capable of i) using the power information received for the normal subframe or ii) receiving only the uplink control channel and downlink ACK channel or iii) receiving only the downlink ACK channel for data channel reception in the ABS. In the case of the control channel and the ACK channel, because only the QPSK transmission and one decoding rate can be used, it is possible to receive data with inaccurate power information.

According to the third exemplary embodiment of the present invention, the eNB is capable of configuring the power control information including two maximum transmit power values. One of the two maximum transmit power values is used for normal subframes, and the other is used for ABS. The eNB is also capable of configured two $P_A$ and $P_B$ pairs based on these two values. In the case in which the $P_B$ is a negative infinite value (-INF), the eNB does not transmit the CRS interference information of the neighbor cell to the UE, and the UE does not use the entire symbols carrying the CRS to receive data. In the case that the $P_B$ is not a negative infinite value, the UE receives the CRS interference information of the neighbor cell to receive some data symbols among all symbols carrying CRS.

The reason why the eNB configures the power control information including two maximum transmit power values is as follows. The eNB allocates power to REs in the form of relative power ratio to the maximum power and this ratio can drop to -6 dB. Accordingly, although the eNB tries to transmit at the lowest power level in the ABS, it is impossible to drop the power below -6 dB. However, because the available transmit power level in the ABS is lower than that in the normal subframe, it is possible to configure the maximum transmit power for ABS separately to transmit at a low transmit power level in the ABS. Such information can be transferred to the UE through $P_{A\_R1}$ and $P_{B\_R11}$. For the interference control of the UE receiver, the information on the position of the symbol not used for reception is transferred. For example, $P_{B\_R11}$, $B_{A\_R11}$, and CRS_interferenceINFO, as show in Table 5, are transmitted and interpreted as follows. First, $P_{B\_R11}$ is defined as shown in Table 4. As compared to the $P_B$ according to the related art, the negative infinite value (−INF) is add. In the case in which the eNB configures new maximum transmit power for ABS, if this value is less than the maximum power used for CRS, it is impossible to allocate power to the PDSCH data RE in the symbol carrying CRS. The symbol carrying CRS has the value meaning no use which is represented by a negative infinite value. Accordingly, the CRS interference information caused by the neighbor cell is negated.

TABLE 4

| | $\tilde{n}_B/\tilde{n}_A$ | |
|---|---|---|
| $P_B$ | 1 Antenna port | 2 or 4 Antenna ports |
| 0 | 1 | 5/4 |
| 1 | 4/5 | 1 |
| 2 | 3/5 | 3/4 |
| 3 | 2/5 | 1/2 |
| 4 | 1/5 | 1/3 |
| 5 | −INF | −INF |

As described in the first and second exemplary embodiments, $P_{A\_R11}$ can be one of the relative value to the PA value in the normal subframe and a relative value to CRS.

The CRS_interferenceINFO is the CRS information of the neighbor cell giving a strong interference to the UE and includes total number of CRS interferences, a number of antenna ports incurring CRS interferences, and offset value indicating the actual position of CRS. If the offset value is set to 0 as compared to the offset value used by the connected cell this means+1, 1 means+2, and 2 means both +1 and +2.

For example, the eNB configures two $P_A$ and $P_B$ pairs. If the $P_B$ value for ABS is negative infinite value, the eNB does not transmit CRS interference information and, otherwise, transmits CRS interference information. This information includes the CRS position information necessary for the receiver to cancel the interference.

TABLE 5

```
-- ASN1START
PDSCH-ConfigCommon ::= SEQUENCE {
    referenceSignalPower    INTEGER (−60 . . . 50),
    p-b      INTEGER (0 . . . 3)
    p-b-r11  INTEGER (0 . . . 5)
}
PDSCH-ConfigDedicated::= SEQUENCE {
    p-a     ENUMERATED {
        dB-6, dB-4dot77, dB-3, dB-1dot77,
        dB0, dB1, dB2, dB3}
    }
PDSCH-ConfigDedicated-r11::= SEQUENCE {
    p-a-r11   ENUMERATED {
        dB-INF, dB-12, dB-11, dB-10, dB-9, dB-7.23,
        dB-6, dB-4.23, dB-3, FFS}
    CRS_Interference       CRS_interferenceINFO
}
CRS_interferenceINFO::= SEQUENCE{ //optional
    NumberOfInterferer    INTEGER(0 . . . 2)
    NumberOfPort          ENUMERATED{1, 2, 4}
    Offset      INTEGER(0 . . . 2)
}
-- ASN1STOP
```

Figure 9:
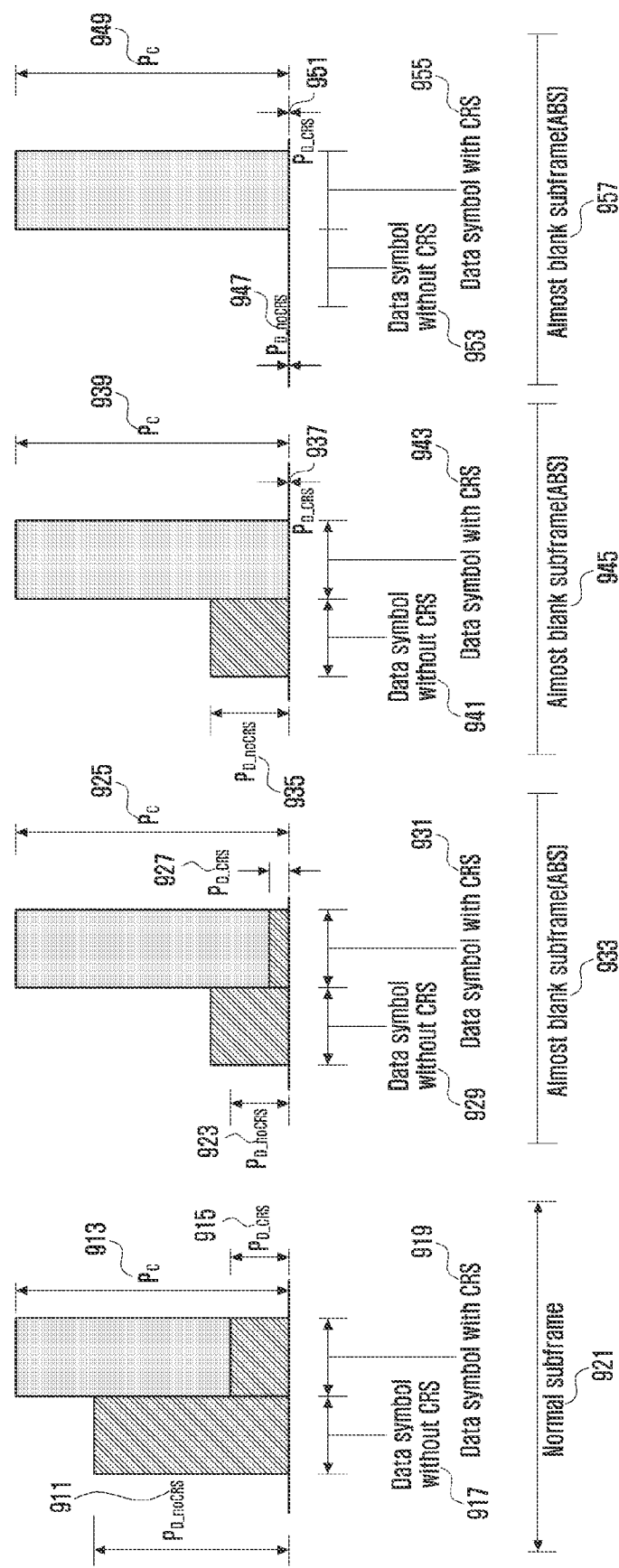
FIG. 9 is a diagram illustrating a configuration of downlink transmit power according to a fourth exemplary embodiment of the present invention.

FIG. 9 is a diagram illustrating a configuration of downlink transmit power according to a fourth exemplary embodiment of the present invention.

Referring to FIG. 9, the eNB schedules data by indicating the $P_{B\_R11}$ value or data transmission mode in the power information for ABS. The eNB is capable of indicating the $P_{A\_R11}$ set to a negative infinite value (−INF) as the $P_B$ value in ABS or the transmission mode for transmitting data rate-matched without UE of data RE of the symbol carrying RS. In this case, the UE calculates the entire data REs with the exception of the data REs of the symbol carrying RS in the PRB allocated for data channel reception in the ABS and uses the calculation result for rate matching to receive Transport Block Set (TBS). If the eNB indicates $P_{A\_R11}$ set to a value, which is not a negative infinite value (−INF), as the $P_B$ value in ABS or indicates the data transmission mode separately, the UE calculates the data REs of all symbols as the entire data REs regardless of presence of RS in the PRB allocated for data channel reception in ABS.

Referring to FIG. 9, the transmit power in the data symbol without CRS is $P_{D\_noCRS}$ 911. The transmit power of CRS in the symbol 919 of the normal subframe 921 is $P_C$ 913 and the data symbol transmit power of the symbol 919 carrying the CRS is $P_{D\_CRS}$ 915. At this time, the eNB notifies the UE of the transmit power ratio of the data symbol carrying no CRS to the CRS transmit power as $P_A$ and the transmit power ratio of the data symbol carrying CRS to the data symbol transmit power in the symbol carrying no CRS as $P_B$.

In the case of the transmission at a low transmit power as in the ABS 933, allocation-available power can be considered. In this case, if the power decrement by 1 dB compared to the 46 dBm transmit power according to the related art as shown in FIG. 7, when the entire transmit power become 41 dB with 5 dB reduction, the power of 100% is used for CRS transmission in the symbol carrying the CRS and thus no power remains for data symbol. In this case, it is possible to allocate power to the data symbol carrying no CRS because the CRS transmit power can be used for data channels. For example, the power allocated for data RE varies depending on the presence or absence of CRS and, if the eNB drops the transmit power over 5 dB, no power to be allocated for data transmission remains in the symbol carrying CRS. Accordingly, the $P_{A\_R11}$ for ABS has to be set to a low value to notify the UE of the reduction of the transmit power, and $P_{B\_R11}$ has to be set to indicate that there is no power allocated for data transmission in the symbol carrying CRS. At this time, $P_{B\_R11}$ is set to a negative infinite value and the UE recognizes that no transmit power is allocated to data REs in the symbols carrying CRS. If the PB_R11 is set to a negative infinite value (−INF), the symbol carrying CRS has no data channel and thus, through rate matching to exclude the corresponding resource in data transmission, it is possible to improve the transmission efficiency. In the case that the $P_{B\_R11}$ is set to a negative infinite value (−INF), the UE receives signals under the assumption that the symbol carrying CRS is not used for data transmission and the eNB performs transmission with the application of rate matching. If the $P_{B\_R11}$ is set to a value other than negative infinite value, the eNB can transmit data in the symbol carrying CRS at low transmit power level and thus it is advantageous to include the data in the corresponding symbol from in view of transmission efficiency and throughput. Accordingly, the UE checks the total number of data REs used in the actual data transmission based on the $P_{B\_R11}$ value informed by the eNB. In an exemplary embodiment of the present invention, the UE is capable of requesting the eNB to notify of the transmission information indicating whether a signal other than $P_{B\_R11}$ is used to indicate whether the data channel is transmitted in the symbol carrying CRS in ABS. Table 7 shows an exemplary format of higher layer signal for notifying the UE of the corresponding information with $P_{A\_R11}$ and $P_{B\_R11}$. Table 8 shows the details of the $P_{B\_R11}$ values including a negative infinite (−INF) value according to the number of antenna ports. Table 9 shows an exemplary format of a signal using a separate indicator other than $_{PB\_R11}$ in a data transmission method proposed in exemplary embodiments of the present invention. The tables provided in the exemplary embodiments of the present invention are exemplary ones and other signaling methods also can be adopted to accomplish the same objects.

According to the fourth exemplary embodiment of the present invention, three data transmission modes can be applied for ABS in the case in which the eNB drops the power in ABS. In FIG. 9, reference numbers 933, 945, and 957 denote the ABS configured in the three data transmission modes, respectively. Referring to FIG. 9, the eNB notifies the UE of the $P_{A\_R11}$ and $P_{B\_R11}$ in the ABS 933 where $P_{B\_R11}$ is set to a value other than the negative infinite value. In this case, the eNB transmits the symbol 929 carrying no CRS at a power level $P_{D\_noCRS}$ 923 lower than that of the normal subframe 917 and notifies the UE with $P_{A\_R11}$. In the case of the symbol 931 carrying CRS, however, the CRS is allocated high power $P_C$ 925 and, as a consequence, the power allocated to the data symbol $P_{D\_CRS}$ 927 decreases such that the $P_{B\_R11}$ is set to a low value to indicate as a ratio to the data RE transmit power 923 in the symbol carrying no CRS. In the case in which the eNB sets the $P_{B\_R11}$ to a negative infinite value (−INF) as denoted by reference number 945, the data transmit power 935 of the symbol carrying no CRS can be set to a value equal to or less than the data transmit power of the symbol carrying no CRS in the ABS 933. In the symbol 943 carrying CRS, however, the eNB notifies the UE of no power allocation for data RE with the $P_{B\_R11}$ as illustrated by $P_{D\_noCRS}$ 937; in such an example, the CRS is allocated high power $P_C$ 939. Based on this notification, the UE performs modulation under the assumption that the corresponding symbol 943 carries no data and rate matching is applied to the transmission. In the case in which scheduling is not performed in ABS as denoted by 957, the eNB may mute transmission regardless of $P_{A\_R11}$ and notify the UE that the UE is not scheduled in the ABS by setting the $P_{A\_R11}$ to the negative infinite value (−INF). In the data symbol 953 carrying no CRS, the data transmit power is $P_{D\_noCRS}$ 947. In the data symbol 955 carrying CRS, the data transmit power is $P_{D\_CRS}$ 951 and the CRS may be allocated a high power $P_C$ 949.

Figure 10:
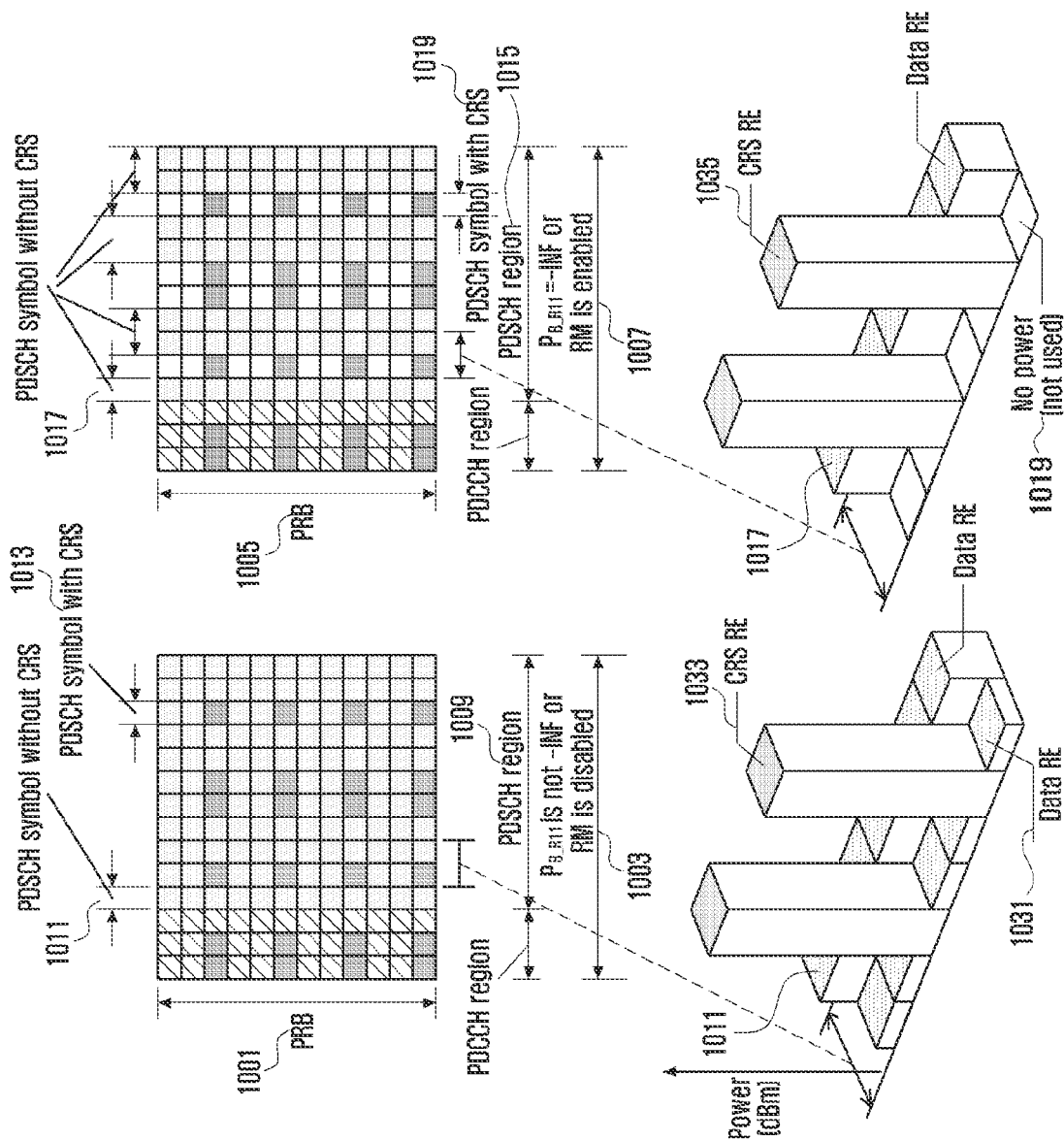
FIG. 10 is a diagram illustrating a power allocation and rate matching for data transmission in an ABS according to an exemplary embodiment of the present invention.

FIG. 10 is a diagram illustrating a power allocation and rate matching for data transmission in an ABS according to an exemplary embodiment of the present invention.

Referring to FIG. 10, reference number 1003 denotes the resource configuration in which PB_R11 is set to a value other than the negative infinite value (−INF) when the eNB transmits data channel to the UE at a low transmit power level in the ABS. Reference number 1001 denotes the Physical Resource Blocks over the resource configuration 1003. Reference number 1009 denotes the PDSCH region over the resource configuration 1003. The resource allocated for data transmission includes the symbol 1013 carrying CRS and symbol 1011 carrying no CRS and rate-matched to use corresponding REs for the give data transmission. Accordingly, the real power is very low in the symbol carrying CRS as denoted by reference number 1031 and higher in the symbol carrying no CRS as denoted by reference number 1011. The power level for the CRS RE is relatively high as illustrated by reference number 1033. Although the transmit power of the data symbol carrying CRS is very low in reception, the UE uses the symbol to receive data. In the case in which RB_R11 is set to the negative infinite value (−INF), the eNB rules out the data RE in the symbol carrying CRS from the resource for data transmission as denoted by reference number 1019 and transmits data after performing rate matching without exception of the corresponding resource. Accordingly, the symbol carrying the CRS is used for transmitting only the CRS as denoted by reference number 1019 and the symbol carrying no CRS is used for transmitting only data as denoted by reference number 1017. Reference number 1007 denotes the resource configuration in which PB_R11 is set to a negative infinite value (−INF). Reference number 1005 denotes the Physical Resource Blocks over the resource configuration 1007. Reference number 1015 denotes the PDSCH region over the resource configuration 1007. Because PA_R11 in the configuration as denoted by reference 1007 can be set to a value lower than that in the configuration as denoted by reference number 1003, it is preferred to use the configuration as denoted by reference number 1003 to transmit at very low transmit power level. The power level for the CRS RE is relatively high as illustrated by reference number 1035.

Figure 11:
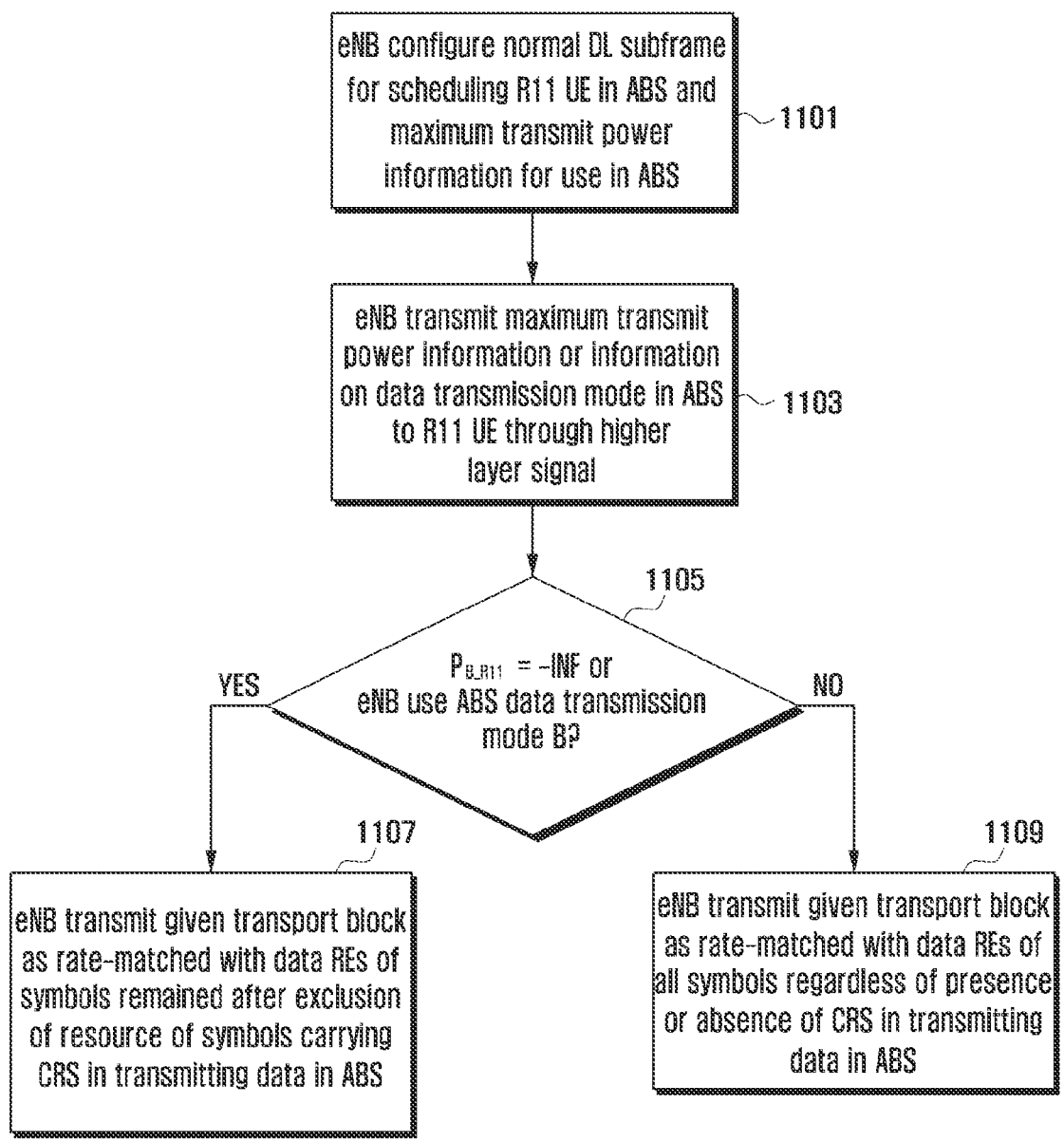
FIG. 11 is a flowchart illustrating a transmission procedure of an eNB according to the fourth exemplary embodiment of the present invention.

FIG. 11 is a flowchart illustrating a transmission procedure of an eNB according to the fourth exemplary embodiment of the present invention.

Referring to FIG. 11, the eNB configures the maximum transmit power information for use in the normal subframe and ABS and downlink power control information for scheduling UEs in the ABS at step 1101. Next, the eNB transmits the power control information or the transmission mode for use in ABS to the UE through higher layer signaling at step 1103. The transmission mode denotes an indicator for indicating the excluded REs and whether to apply rate matching. For convenience, the transmission mode including rate matching with the inclusion of the data REs to which CRS is mapped is referred to as mode A, and the transmission mode including rate matching with the exclusion of the data REs to which CRS is mapped is referred to as mode B. Next, the eNB determines whether PB_R11 is set to a negative infinite value (−INF) or whether the transmission mode B is used in the power control information at step 1105. If PB_R11 is set to a negative infinite value (−INF) or if the transmission mode B is used in the power control information, the eNB performs rate matching with the exclusion of the data REs of the symbol carrying CRS to transmit the data in ABS at step 1107. Otherwise, the eNB performs rate matching with the inclusion of the data REs of the symbol carrying CRS to transmit data in ABS at step 1109.

Figure 12:
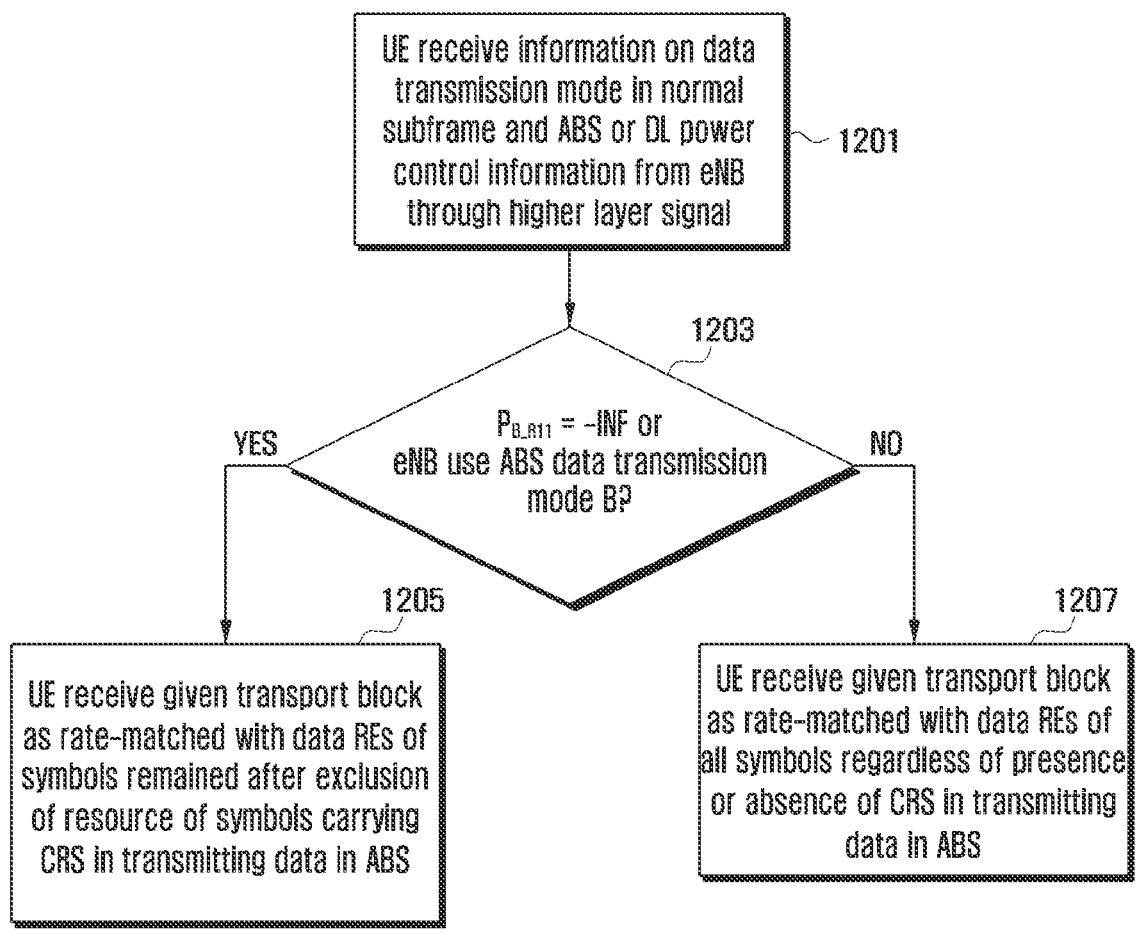
FIG. 12 is a flowchart illustrating a reception procedure of an UE according to the fourth embodiment of the present invention.

FIG. 12 is a flowchart illustrating a reception procedure of an UE according to the fourth exemplary embodiment of the present invention.

Referring to FIG. 12, the UE receives the power control information or the transmission mode for use in receipt of data channel from the eNB in the normal subframe and ABS at step 1201. Next, the UE determines whether RB_R11 is set to a negative infinite value (−INF) or the mode B is used in the received power control information at step 1203. If RB_R11 is set to a negative infinite value (−INF) or the mode B is used in the received power control information, the UE receives the data channel under the assumption of rate matching with the exclusion of the data REs of the symbol carrying CRS in ABS at step 1205 and, otherwise, under the assumption of rate matching with the inclusion of the data REs of the symbol carrying CRS in ABS at step 1207.

TABLE 6

| | | Total eNB TX power (dBm) | | | | | |
|---|---|---|---|---|---|---|---|
| | | 46 | 45 | 44 | 43 | 42 | 41 |
| a | total CRS power (W) | 12.61915 | 12.61915 | 12.61915 | 12.61915 | 12.61915 | 12.61915 |
| b | Total eNB TX power (W) | 39.81072 | 31.62278 | 25.11886 | 19.95262 | 15.84893 | 12.58925 |
| c | Remainig TX power (W) (b − a) | 27.19157 | 19.00363 | 12.49972 | 7.333476 | 3.229785 | −0.02989 |
| d | Maximum PDSCH RE EPRE with CRS (dBm) | 18.32374 | 16.76777 | 14.9484 | 12.6325 | 9.071136 | −INF |
| e | CRS EPRE (dBm) | 18 | 18 | 18 | 18 | 18 | 18 |
| f | Rho B(dB)(d − e) | 0.323743 | −1.23223 | −3.0516 | −5.3675 | −8.92886 | −INF |
| g | Maximum PDSCH RE EPRE without CRS (dBm) | 18.21849 | 17.21849 | 16.21849 | 15.21849 | 14.21849 | 13.21849 |
| h | Rho_A (dB) (g − e) | 0.218487 | −0.78151 | −1.78151 | −2.78151 | −3.78151 | −4.78151 |
| i | P B (f − h) | 0.105255 | −0.45072 | −1.27009 | −2.58599 | −5.14735 | −INF |
| j | P B (linear of i) | 1.024532 | 0.901421 | 0.746434 | 0.551317 | 0.305678 | −INF |
| k | P A (dB) (g − e) | 0.218487 | −0.78151 | −1.78151 | −2.78151 | −3.78151 | −4.78151 |

TABLE 7

```
-- ASN1START
PDSCH-ConfigCommon ::= SEQUENCE {
    referenceSignalPower    INTEGER (−60 ... 50),
    p-b        INTEGER (0 ... 3)
    p-b-r11    INTEGER (0 ... 7)
}
PDSCH-ConfigDedicated::= SEQUENCE {
    p-a    ENUMERATED {
        dB-6, dB-4dot77, dB-3, dB-1dot77,
        dB0, dB1, dB2, dB3}
}
PDSCH-ConfigDedicated-r11::= SEQUENCE {
    p-a-r11    ENUMERATED {
        dB-INF, dB-13, dB-12, dB-11, dB-10, dB-9,
        dB-8, dB-7}
}
-- ASN1STOP
```

TABLE 8

| | $\tilde{n}_B / \tilde{n}_A$ | |
|---|---|---|
| $P_B$ | 1 Antenna Port | 2 or 4 Antenna Ports |
| 0 | 1 | 5/4 |
| 1 | 4/5 | 1 |
| 2 | 3/5 | 3/4 |
| 3 | 2/5 | 1/2 |
| 4 | 1/5 | 1/3 |
| 5 | −INF | 1/4 |
| 6 | RESERVED | 1/8 |
| 7 | RESERVED | −INF |

TABLE 9

```
-- ASN1START
PDSCH-ConfigCommon ::= SEQUENCE {
    referenceSignalPower    INTEGER (−60 ... 50),
    p-b        INTEGER (0 ... 3)
    RateMatching    BOOLEAN
}
PDSCH-ConfigDedicated::= SEQUENCE {
    p-a    ENUMERATED {
```

TABLE 9-continued

```
        dB-6, dB-4dot77, dB-3, dB-1dot77,
        dB0, dB1, dB2, dB3}
}
PDSCH-ConfigDedicated-r11::= SEQUENCE {
    p-a-r11    ENUMERATED {
        dB-INF, dB-13, dB-12, dB-11, dB-10, dB-9,
        dB-8, dB-7}
}
-- ASN1STOP
```

In order to adjust the inter-cell interference in the ABS for which $P_{A\_R11}$ and $P_{B\_R11}$ are configured as above, the eNB is capable of transmitting downlink power information through inter-cell communication with another eNB. At this time, $P_{A\_R11}$ configured for each UE and $P_{B\_R11}$ configured for each cell are transmitted along with the information on the downlink power for used in the normal subframe. The power control value $P_A$ according to the related art is included in the message of RNTP and transmitted to the neighbor cell along with $P_B$. accordingly, $P_{A\_R11}$ is configured as a new RNTP to be transmitted along with the $P_{B\_R11}$. If the $P_{B\_R11}$ of the neighbor cell is set to 0, this means that the data symbol carrying CRS is not used by the neighbor cell and thus the information indicating no interference caused by the neighbor cell is transmitted additionally. Accordingly, it is important to transmit $P_{B\_R11}$ in ABS. In the region such as ABS where the inter-cell interference is sensitive, information on the interference to the symbol is provided and thus the scheduler is capable of improving the reception performance of the UE in the neighbor cell. The PA according to the related art is defined by equation (6):

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_nom}^{(p)}} \text{ is made} \end{cases} \quad (6)$$

-continued where $$E^{(p)}_{max\_nom} = \frac{P^{(p)}_{max} \cdot \frac{1}{\Delta f}}{N^{DL}_{RB} \cdot N^{RB}_{SC}}$$

and $$RNTP_{threshold} \in \{-\infty, -11, -10, -9, -8,$$
$$-7, -6, -5, -4, -3, -2, -1, 0, +1, +2, +3\}.$$

For example, if the value of RNTP which is indicated in unit of PRB is set to 0, this means that the neighbor cell informs that the corresponding PRB does not exceed the indicated value of $RNTP_{threshold}$. Otherwise, if RNTP is set to 1, this means that the PRB is transmitted without such a restriction.

The $P_{A\_R11}$ also can be indicated in the following two ways using RNTP. In the first way, if the $P_{A\_R11}$ is set to 0 like PA, this means that the corresponding PRB does not exceed a specific transmit power and, otherwise if the $P_{A\_R11}$ is set to 1, this means that the corresponding PRB is transmitted without power restriction. See equation (7):

$$RNTP(n_{PRB}) = \begin{cases} 0 & \text{if } \frac{E_A(n_{PRB})}{E^{(p)}_{max\_nom,ABS}} \leq RNTP_{threshold,ABS} \\ 1 & \text{if no promise about the upper limit of } \frac{E_A(n_{PRB})}{E^{(p)}_{max\_nom,ABS}} \text{ is made} \end{cases} \quad (7)$$

where $$E^{(p)}_{max\_nom,ABS} = \frac{P^{(p)}_{max,ABS} \cdot \frac{1}{\Delta f}}{N^{DL}_{RB} \cdot N^{RB}_{SC}}$$

and $$RNTP_{threshold,ABS} \in \{-\infty, -11, -10, -9,$$
$$-8, -7, -6, -5, -4, -3, -2, -1, 0, +1, +2, +3\}.$$

In the second way, if the RNTP of PRB for ABS is set to 0, this means that the transmission is performed at a power level below a predetermined value; otherwise, if the RNTP of PRB is set to 1, this means that the threshold of the transmit power is negative infinite (−INF) such that there is on interference in the corresponding PRB. Because most PRBs are not allocated power in ABS but the neighbor PRB transmits specific PRBs to adjacent UEs at low transmit power level, it is advantageous notifying of no use of power of specific PRB rather than notifying of transmission of specific PRB without power restriction. See equation (8):

$$RNTP(n_{PRB}) = \begin{cases} 0 & \text{if } \frac{E_A(n_{PRB})}{E^{(p)}_{max\_nom,ABS}} \leq RNTP_{threshold,ABS} \\ 1 & \text{if } \frac{E_A(n_{PRB})}{E^{(p)}_{max\_nom,ABS}} = -INF \end{cases} \quad (8)$$

where $$E^{(p)}_{max\_nom,ABS} = \frac{P^{(p)}_{max,ABS} \cdot \frac{1}{\Delta f}}{N^{DL}_{RB} \cdot N^{RB}_{SC}}$$

and $$RNTP_{threshold,ABS} \in \{-\infty, -11, -10, -9,$$
$$-8, -7, -6, -5, -4, -3, -2, -1, 0, +1, +2, +3\}.$$

Figure 13:
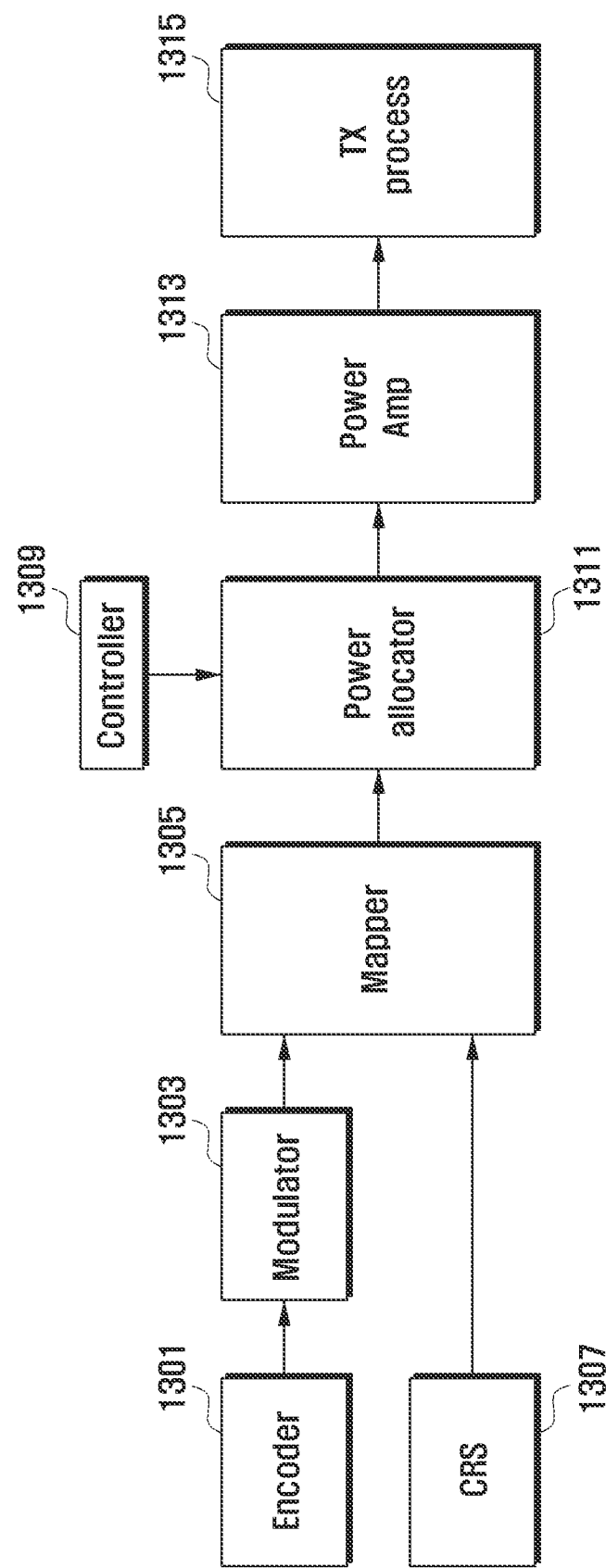
FIG. 13 is a block diagram illustrating a configuration of an eNB transmitter according to an exemplary embodiment of the present invention.

FIG. 13 is a block diagram illustrating a configuration of an eNB transmitter according to an exemplary embodiment of the present invention.

Referring to FIG. 13, the controller 1309 controls overall operations of the eNB. The encoder 1301 encodes the data to be transmitted and outputs the coded data to the modulator 1303. The modulator 1303 modulates the data and outputs the modulated data to the mapper 1305. The CRS 1307 is also input to the mapper 1305. The mapper 1305 maps the data output by the modulator 1303 and the CRS 1307 to the physical region of resource. The power allocator 1311 allocates power for the data channel to be transmitted based on the downlink power control information delivered to the UE. The power amplifier 1313 amplifies the data channel, and the transmitter 1315 transmits the amplified data channel.

Figure 14:
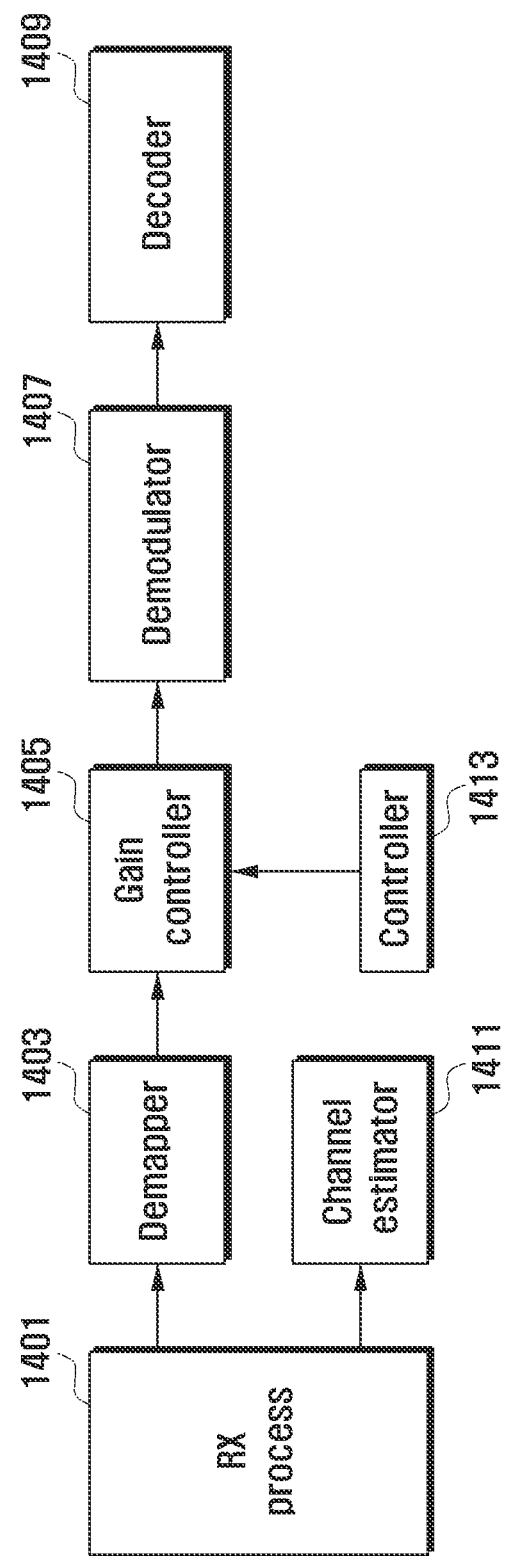
FIG. 14 is a block diagram illustrating a configuration of an UE receiver according to an exemplary embodiment of the present invention.

FIG. 14 is a block diagram illustrating a configuration of an UE receiver according to an exemplary embodiment of the present invention.

Referring to FIG. 14, the receiver 1401 receives data channel and transfers the received data to the demapper 1403. The demapper 1403 performs demapping the channel allocated to the UE from the received channel. The channel estimator 1411 estimates a channel. The controller 1413 controls the gain controller 1405 to adjust the gain of each symbol along with the channel estimation information using the received downlink power information. The gain controller 1405 adjusts the gain of each symbol along with the channel estimation information using the downlink power information. The adjusted signal is transferred to the demodulator 1407. The demodulator 1407 demodulates the received signal and outputs the demodulated signal to the decoder 1409. The decoder 1409 decodes the received signal.

As described above, the downlink power control method and apparatus according to exemplary embodiments of the present invention is capable of regulating inter-cell interference variation between contiguous symbols at a predetermined level in a subframe at a terminal of a neighbor cell and making it possible to schedule the UE receiving the low power data channel using the power ratio of the feedbacks from the UE.

Although exemplary embodiments of the present invention have been described in detail hereinabove with specific terminology, this is for the purpose of describing particular exemplary embodiments only and not intended to be limiting of the invention. While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A downlink power control method of a base station, the method comprising:
   transmitting a downlink data channel at a normal subframe according to first downlink power information for the normal subframe; and
   transmitting the downlink data channel at an Almost Blank Subframe (ABS) according to second downlink power information for the ABS, wherein a same transmit power is allocated for symbols carrying common reference signal (CRS) and symbols carrying no CRS in the ABS, and wherein the first downlink power information for the normal subframe and the second downlink power information for the ABS differ from each other.

2. The downlink power control method of claim 1, wherein different transmit powers are allocated for symbols carrying CRS and symbols carrying no CRS in the normal subframe.

3. The downlink power control method of claim 1, wherein the transmitting of the downlink data channel at the ABS comprises skipping a mapping of the downlink data channel to symbols carrying CRS in the ABS.

4. The downlink power control method of claim 1, further comprising:

configuring the first downlink power information for the normal subframe and the second downlink power information for the ABS; and transmitting the first downlink power information for the normal subframe and the second downlink power information for the ABS to a terminal.

5. A base station for controlling downlink power, the base station comprising:

a transmitter for transmitting a downlink data channel at a normal subframe according to first downlink power information for the normal subframe and for transmitting a downlink data channel at an almost Blank Subframe (ABS) according to second downlink power information for the ABS, wherein a same transmit power is allocated for symbols carrying common reference signal (CRS) and symbols carrying no CRS in the ABS, and wherein the first downlink power information for the normal subframe and the second downlink power information for the ABS differ from each other.

6. The base station of claim 5, wherein different transmit powers are allocated for symbols carrying CRS and symbols carrying no CRS in the normal subframe.

7. The base station of claim 5, further comprising:

a controller for controlling the transmitter to skip a mapping of the downlink data channel to symbols carrying CRS in the ABS.

8. The base station of claim 5, further comprising:

a controller for configuring the first downlink power information for the normal subframe and the second downlink power information for the ABS, wherein the transmitter transmits the first downlink power information for the normal subframe and the second downlink power information for the ABS to a terminal.

9. A downlink reception method of a terminal, the method comprising:

receiving a downlink data channel at a normal subframe according to first downlink power information for the normal subframe; and receiving the downlink data channel at an Almost Blank Subframe (ABS) according to second downlink power information for the ABS, wherein a same transmit power is applied to symbols carrying common reference signal (CRS) and symbols carrying no CRS in the ABS, and wherein the first downlink power information for the normal subframe and the second downlink power information for the ABS differ from each other.

10. The downlink reception method of claim 9, wherein different transmit powers are applied to symbols carrying CRS and symbols carrying no CRS in the normal subframe.

11. The downlink reception method of claim 9, further comprising:

receiving the first downlink power information for the normal subframe and the second downlink power information for the ABS; and receiving the downlink data channel in the normal subframe and the ABS according to the first downlink power information and the second downlink power information.

12. A terminal for receiving downlink data channel, the terminal comprising:

a receiver for receiving a downlink data channel at a normal subframe according to first downlink power information for a normal subframe and for receiving a downlink data channel at an Almost Blank Subframe (ABS) according to second downlink power information for ABS, wherein a same transmit power is applied to symbols carrying common reference signal (CRS) and symbols carrying no CRS in the ABS, and wherein the first downlink power information for the normal subframe and the second downlink power information for the ABS differ from each other.

13. The terminal of claim 12, wherein different transmit powers are applied to symbols carrying CRS and symbols carrying no CRS in the normal subframe.

14. The terminal of claim 12, wherein the receiver receives the first downlink power information for the normal subframe and the second downlink power information for the ABS and receives the downlink data channel in the normal subframe and ABS according to the first downlink power information and the second downlink power information.

* * * * *